US011632760B2

(12) United States Patent
Li et al.

(10) Patent No.: US 11,632,760 B2
(45) Date of Patent: Apr. 18, 2023

(54) METHOD AND DEVICE FOR RESOURCE CONFIGURATION

(71) Applicant: Telefonaktiebolaget LM Ericsson (publ), Stockholm (SE)

(72) Inventors: Shaohua Li, Beijing (CN); Efthymios Stathakis, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 33 days.

(21) Appl. No.: 16/309,802

(22) PCT Filed: May 25, 2018

(86) PCT No.: PCT/CN2018/088478
§ 371 (c)(1),
(2) Date: Dec. 13, 2018

(87) PCT Pub. No.: WO2018/219228
PCT Pub. Date: Dec. 6, 2018

(65) Prior Publication Data
US 2019/0254018 A1    Aug. 15, 2019

(30) Foreign Application Priority Data
May 27, 2017    (WO) ................ PCT/CN2017/086412

(51) Int. Cl.
*H04W 72/04*    (2023.01)
*H04L 5/00*    (2006.01)
*H04W 72/08*    (2009.01)

(52) U.S. Cl.
CPC ......... *H04W 72/048* (2013.01); *H04L 5/0005* (2013.01); *H04L 5/0007* (2013.01);
(Continued)

(58) Field of Classification Search
CPC ............ H04W 72/048; H04W 72/087; H04W 72/042; H04W 72/04; H04W 72/044;
(Continued)

(56) References Cited

U.S. PATENT DOCUMENTS

2010/0278109 A1* 11/2010 Papasakellariou .... H04L 5/0037
370/328
2015/0312074 A1* 10/2015 Zhu ....................... H04W 52/16
370/329
(Continued)

FOREIGN PATENT DOCUMENTS

CN    104640220 A    5/2015
CN    104883746 B  *  9/2018    ........ H04W 74/0833
(Continued)

OTHER PUBLICATIONS

Hu, "MU-MIMO, NOMA and D2D in 5G/IoT Wireless Systems", Nov. 9, 2016, IEEE Communications Society (Year: 2016).*
Zeng, "Method, network apparatus and terminal apparatus for transmitting uplink data", Mar. 16, 2017, WO, WO 2017041683, English machine language translation. (Year: 2017).*
(Continued)

*Primary Examiner* — Michael K Phillips
(74) *Attorney, Agent, or Firm* — Christopher & Weisberg, P.A.

(57) ABSTRACT

Embodiments of the disclosure generally relate to resource configuration. A network device configures, based on an access mode of a terminal device, an information transmission pattern for the terminal device from a first resource set associated with a MOMA mode and a second resource set associated with a NOMA mode.

22 Claims, 6 Drawing Sheets

(52) U.S. Cl.
CPC ....... *H04W 72/042* (2013.01); *H04W 72/087* (2013.01); *H04L 5/0037* (2013.01); *H04L 5/0051* (2013.01)

(58) Field of Classification Search
CPC ............. H04W 72/0493; H04W 88/06; H04W 72/085; H04W 52/241; H04L 5/0037; H04L 5/0051; H04L 5/00; H04L 5/0064; H04L 1/0026; H04L 1/0003; H04L 5/0096; H04L 5/0007; H04L 5/0005
See application file for complete search history.

(56) References Cited

U.S. PATENT DOCUMENTS

| | | | | |
|---|---|---|---|---|
| 2015/0358971 | A1* | 12/2015 | Soriaga | H04B 7/046 370/329 |
| 2016/0014760 | A1* | 1/2016 | Lyu | H04B 7/2615 370/329 |
| 2017/0201317 | A1* | 7/2017 | Lee | H04B 7/26 |
| 2018/0035179 | A1* | 2/2018 | Lee | H04Q 3/002 |
| 2018/0376409 | A1* | 12/2018 | Tani | H04W 48/10 |
| 2019/0029031 | A1* | 1/2019 | Kumar | H04L 5/003 |
| 2019/0182007 | A1* | 6/2019 | Liu | H04L 5/003 |
| 2019/0223225 | A1* | 7/2019 | Lee | H04L 25/03866 |
| 2020/0037345 | A1* | 1/2020 | Ryoo | H04W 76/10 |
| 2020/0295891 | A1* | 9/2020 | Koh | H04B 7/0417 |
| 2020/0314600 | A1* | 10/2020 | Kolde | H04W 24/08 |

FOREIGN PATENT DOCUMENTS

| | | |
|---|---|---|
| EP | 3220564 A1 | 9/2017 |
| WO | 2016 153555 A1 | 9/2016 |
| WO | 2016 188195 A1 | 12/2016 |
| WO | 2017041683 A1 | 3/2017 |

OTHER PUBLICATIONS

Ksairi et al., "A Multi-Service Oriented Multiple Access Scheme for M2M Support in Future LTE", Jan. 2017, IEEE, IEEE Communications Magazine, pp. 218-224 (Year: 2017).*
Plass et al., "MC-CDMA Versus OFDMA in Cellular Environments", Sep. 2005, IEEE, 2005 13th European Signal Processing Conference (Year: 2005).*
Kang et al, "A random access method and device", Sep. 11, 2018, CN, English language translation of CN 104883746. (Year: 2018).*
PCT International Preliminary Report On Patentability for International application No. PCT/CN2018/088478—dated Sep. 19, 2019.
PCT Notification of Transmittal of the International Search Report and the Written Opinion of the International Searching Authority, or the Declaration for International application No. PCT/CN2018/088478—dated Aug. 29, 2018.
3GPP TR 37.868 v11.0.0; Technical Report; 3rd Generation Partnership Project; Technical Specification Group Radio Access Network; Study on RAN Improvements for Machine-type Communications (Release 11)—Sep. 2011.
3GPP TR 38.913 v0.3.0; Technical Report; 3rd Generation Partnership Project; Technical Specification Group Radio Access Network; Study on Scenarios and Requirements for Next Generation Access Technologies (Release 14)—Mar. 2016.
Non-Orthogonal Multiple Access for 5G: Solutions, Challenges, Opportunities, and Future Research Trends, Software Defined 5G Networks for Anything as a Service by Linglong Dai et al.—Sep. 2015.
EPO issued Extended European Search Report for Application No./Patent No. 18808820.7-1215 / 3459309 PCT/CN2018088478—dated Apr. 11, 2019.
Intellectual Property of India, Government of India, Examination report under sections 12 & 13 of the Patents Act, 1970 and the Patent Rules, 2003; Application No. 201837047055, Dispatch date: Jul. 1, 2020.
European Patent Office, Communication pursuant to Article 94(3) EPC, App No. 18 808 820.7-1215, ref136153EPPC, dated Jul. 22, 2020.

* cited by examiner

FIG. 1

CONFIGURE AN INFORMATION TRANSMISSION PATTERN FOR A TERMINAL DEVICE BASED ON AN ACCESS MODE OF THE TERMINAL DEVICE FROM A FIRST RESOURCE SET AND A SECOND RESOURCE SET — 210

FIG. 2

OBTAIN THE ACCESS MODE OF THE TERMINAL DEVICE — 310

SELECT THE INFORMATION TRANSMISSION PATTERN BASED ON THE ACCESS MODE — 320

METHOD AND DEVICE FOR RESOURCE CONFIGURATION

PRIORITY

This nonprovisional application is a U.S. National Stage Filing under 35 U.S.C. § 371 of International Patent Application Serial No. PCT/CN2018/088478 filed May 25, 2018 and entitled "METHOD AND DEVICE FOR RESOURCE CONFIGURATION" which claims priority to International Patent Application Serial No. PCT/CN2017/086412 filed May 27, 2017, both of which are hereby incorporated by reference in their entirety.

FIELD

Embodiments of the present disclosure generally relate to the field of communications, and more particularly, to a method and device for resource configuration.

BACKGROUND

In current cellular systems, such as Long Term Evolution (LTE) and New Radio (NR) standards in 3GPP, time/frequency resources for uplink (UL) transmissions are typically scheduled by a network device, for example, the eNB or the gNB. Resource allocation is conducted either in a dynamic fashion, i.e., the gNB schedules the UL transmission per transmission time interval (TTI), or via semi-persistent scheduling (SPS) where resources with certain periodicity are granted to user equipment (UE). The smallest schedulable unit, within a granted resource, is the physical resource block (PRB), which spans 12 contiguous frequency resources elements (RE). In other words, a PRB is the smallest schedulable unit and a batch (or batches) of 12 REs is always exclusively assigned to a single UE.

It is being discussed in 3GPP how to enhance the current mobile communication systems in order to facilitate machine-type-communications. One such use-case is massive MTC (mMTC), where a high density of UEs, for example, $10^6$ UEs/km$^2$, with extended coverage capabilities, should be supported. Use-cases with such requirements include, for example, smart grid where numerous sensors are monitoring the network activity and take certain actions or transmit alarming signals, vehicles in traffic, traffic lights and other infrastructure that is supplied with sensors, and so on.

In NR, it has been studied to support, among others, for non-orthogonal multiple access (NOMA). In UL NOMA, UE transmissions are overlapping on shared time and frequency resources, by using properly designed sequences/vectors in order to spread the information symbols in frequency. The idea behind the NOMA paradigm is that the clever design of spreading matrices can facilitate the implementation of advanced multi-user detectors, such as the minimum-mean squared-error (MMSE) or the maximum a posteriori (MAP) detector, in order to enhance the detection/demodulation performance of the superimposed transmissions. NOMA-enabled UEs can enjoy improved performance in situations where time/frequency resources can be shared.

In mMTC scenarios with, in principle, up to $10^6$UEs/Km$^2$, it is a challenge how to accommodate even a fraction of active UEs, which have data packets in their buffer. Some studies on the random access (RA) capacity limits of LTE conclude that the number of RA Opportunities (RAOs) is 10800 preambles/sec, in the best case scenario, which is the ultimate limit in the number of simultaneously accommodated non-overlapping transmissions. Yet even in the ideal case where no collisions occur, the max number of RAOs falls short and the available data transmission slots are insufficient to accommodate all requested grants in scenarios where the number of UEs is of the order (or a fraction) of $10^6$ UEs. To serve such high UE density, it is significant to relax the exclusive granting, to a UE, of a data-transmission slot and instead allow for the overlap of multiple UEs, that is to say that physical resources should be shared. In other words, it is crucial to shift between orthogonal and non-orthogonal multiple access modes.

SUMMARY

In general, embodiments of the present disclosure provide a solution for solving at least part of the issue as discussed above.

In a first aspect, a method implemented at a network device is provided. The network device configures, based on an access mode of a terminal device, art information transmission pattern for the terminal device from a first resource set associated with a multiplexed orthogonal multiple access (MOMA) mode and a second resource set associated with a NOMA mode.

In one embodiment, configuring the information transmission pattern may comprise: obtaining the access mode of the terminal device; and selecting the information transmission pattern from the first resource set and the second resource set based on the access mode of the terminal device.

In one embodiment, obtaining the access mode of the terminal device may comprise: determining the access mode of the terminal device based on at least one of a coverage of the terminal device, system traffic, and required quality of service for a traffic.

In one embodiment, determining the access mode of the terminal device may comprise: in response to the coverage of the terminal device exceeding a coverage threshold and/or the system traffic exceeding a traffic threshold and/or the required QoS being lower than a predetermined QoS threshold, determining the NOMA mode as the access mode of the terminal device; and in response to the coverage of the terminal device being less than the coverage threshold and/or the system traffic being less than the traffic threshold and/or the required QoS being higher than the predetermined QoS threshold, determining the MOMA mode as the access mode of the terminal device.

In one embodiment, the method may further comprise at least one of: determining the coverage of the terminal device based on a quality of a channel between the network device and the terminal device; determining the system traffic based on a work load of the network device; and determining the quality of service based on the type of traffic.

In one embodiment, selecting the information transmission pattern comprises: in response to the access mode being the MOMA mode, selecting the information transmission pattern from the first resource set; and in response to the access mode being the NOMA mode, selecting the information transmission pattern from the second resource set.

In one embodiment, the method may further comprise: configuring the first resource set and the second resource set.

In one embodiment, the information transmission pattern may include one or more of: a multiplexing pattern, a spreading matrix, and a reference signal pattern.

In one embodiment, the method may further comprise: transmitting information about the information transmission pattern to the terminal device.

In a second aspect, a network device is provided. The network device includes: a processor and a memory. The memory contains instructions executable by the processor, whereby the processor being adapted to cause the network device to perform the method according to the first aspect of the present disclosure.

In a third aspect, a method implemented at a terminal device is provided. The terminal device receives information about an information transmission pattern from a network device, the information transmission pattern being configured by the network device based on an access mode of the terminal device from a first resource set associated with a MOMA mode and a second resource set associated with a NOMA mode. Then, the terminal device performs transmission to the network device based on the received information.

In an embodiment, performing transmission to the network device may comprise: determining, based on the received information, the information transmission pattern from the first resource set and the second resource set; and performing the transmission to the network device based or the information transmission pattern.

In an embodiment, the method may further comprise: receiving, from the network device, information about the first resource set and the second resource set configured at the network device.

In an embodiment, the information transmission pattern may include one or more of: a multiplexing pattern, a spreading matrix, and a reference signal pattern.

In a fourth aspect, a terminal device is provided. The terminal device includes: a processor and a memory. The memory contains instructions executable by the processor, whereby the processor being adapted to cause the terminal device to perform the method according to the fourth aspect of the present disclosure.

According to embodiments of the present disclosure, an information transmission pattern is configured for a terminal device based on a multiple access mode of the terminal device. As such, the terminal device can use the configured information transmission pattern to perform UL transmission in the corresponding multiple access mode, even in the same resources. In this way, an efficient way is provided to accommodate a large number of terminal devices. As a result, the coverage and the sum-rate performance are improved.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers to a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth.

Yet further examples of the network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of Things (IOT) scenario, a terminal device may represent a machine or other device that performs monitoring and/or measurements, and transmits the results of such monitoring and/or measurements to another terminal device and/or a network device. The terminal device may in this case be a machine-to-machine (M2M) device, which may in a 3GPP context be referred to as a machine-type communication (MTC) device. As one particular example, the terminal device may be a UE implementing the 3GPP narrow band interne of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

As used herein, the singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figures 1, 2:
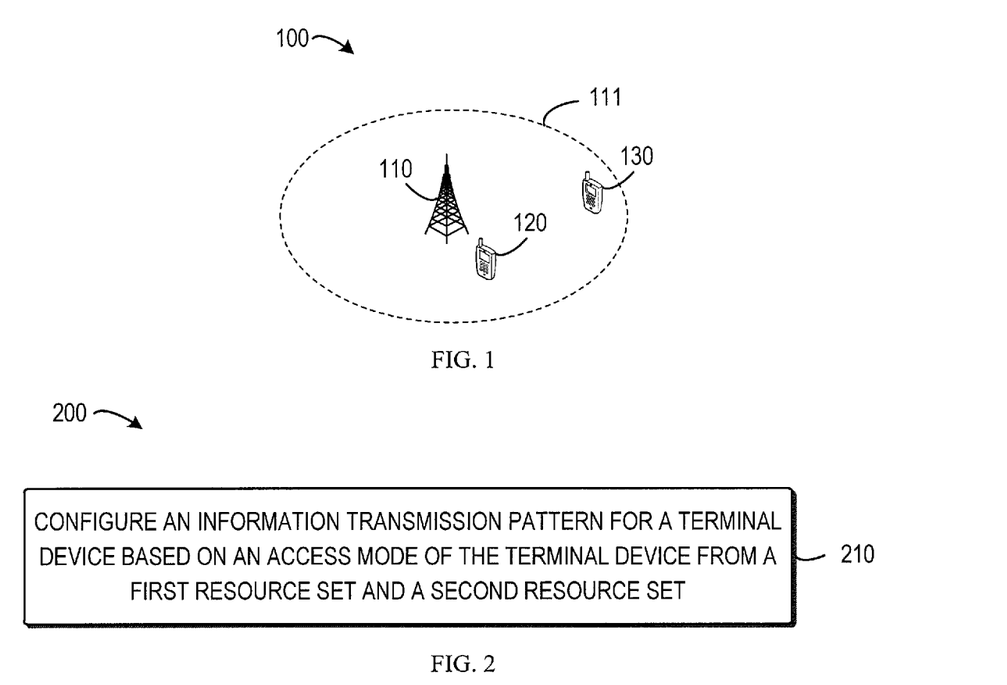
FIG. 1 shows a schematic diagram 100 of a wireless communication network.
FIG. 2 shows a flowchart of a method 200 of configuring an information transmission pattern in accordance with an embodiment of the present disclosure.

Now some exemplary embodiments of the present disclosure will be described below with reference to the figures. Reference is first made to FIG. 1, which shows a schematic diagram 100 of a wireless communication network. In the wireless communication network, a network device 110 manages a serving cell 111 in which two terminal devices 120 and 130 are located.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

Conventionally, one way to enhance the system capacity is orthogonal multiple access (OMA). More specifically, assuming that L PRBs are released for mMTC and that a transport block (TB) of a terminal device (for example, a UE) occupies M PRBs. Then, for K UEs, K×M PRBs are needed in order to accommodate all TBs. Using the OMA, we need to have the condition L>KM satisfied, in order to accommodate all mMTC UE TBs. However, in massive mMTC, the number K of UEs will be very large and the resources will not suffice to accommodate all UEs.

In order to solve the above and other potential problems, embodiments of the present disclosure provide solutions for configuring an information transmission pattern based on an access mode of the terminal device. In the proposed solution, different information transmission patterns may be configured for the multiplexed orthogonal multiple access (MOMA) mode or the non-orthogonal multiple access (NOMA) mode. As such, the terminal device can use the configured information transmission pattern to perform UL transmission in the corresponding multiple access mode, even in the same resources. In this way, an efficient way is provided to accommodate a large number of terminal devices. As a result, the coverage and the sum-rate performance are improved.

More details of embodiments of the present disclosure will be discussed with reference to FIGS. 2 to 13 below. FIG. 2 shows a flowchart of a method 200 of configuring an information transmission pattern in accordance with an embodiment of the present disclosure. With the method 200, the above and other potential deficiencies in the conventional approaches can be overcome. It would be appreciated by those skilled in the art that the method 200 may be implemented by a network device, such as the network device 110 or other suitable devices. The terminal device discussed in the embodiments of FIG. 2 may be the terminal device 120 or 130, or any other suitable terminal device.

The method 200 is entered at block 210, where the network device configures, based on an access mode of a terminal device, an information transmission pattern for the terminal device from a first resource set associated with a multiplexed orthogonal multiple access (MOMA) mode and a second resource set associated with a non-orthogonal multiple access (NOMA) mode.

The information transmission pattern may include a multiplexing pattern, a spreading matrix, a reference signal pattern, and/or other suitable pattern. The multiplexing pattern indicates UE's occupancy of time-frequency resources, and may be also referred to as the "occupancy pattern" hereafter. More details of the multiplexing pattern will be discussed below with reference to embodiments of FIGS. 4A and 4B.

The spreading matrix indicates a code that spreads the bit information. In an embodiment, the spreading matrix may be implemented as a 1*N matrix, that is, a spreading vector. Although some embodiments of the present disclosure use the spreading vector in discussion, it is to be understood that the spreading vector is a one dimensional spreading matrix. More details of the spreading matrix will be discussed below with reference to embodiments of FIG. 5.

Figure 8:
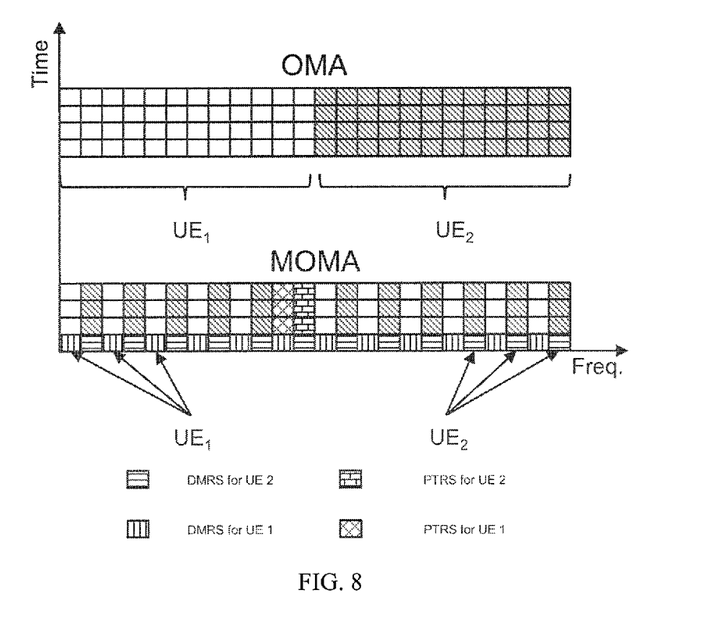
FIG. 8 shows a diagram of a reference signal pattern in the MOMA mode in accordance with embodiments of the present disclosure.
Figure 9:
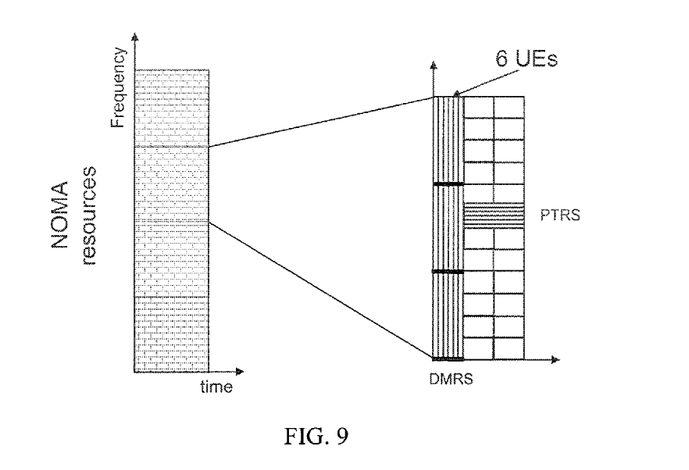
FIG. 9 shows a diagram of a reference signal pattern in the NOMA mode in accordance with embodiments of the present disclosure.

More details of the reference signal pattern will be discussed below with reference to embodiments of FIGS. 8 and 9.

The access mode of the terminal device may be the MOMA mode, the NOMA mode, or other suitable mode that has been developed or to be developed in the future.

Figure 3:
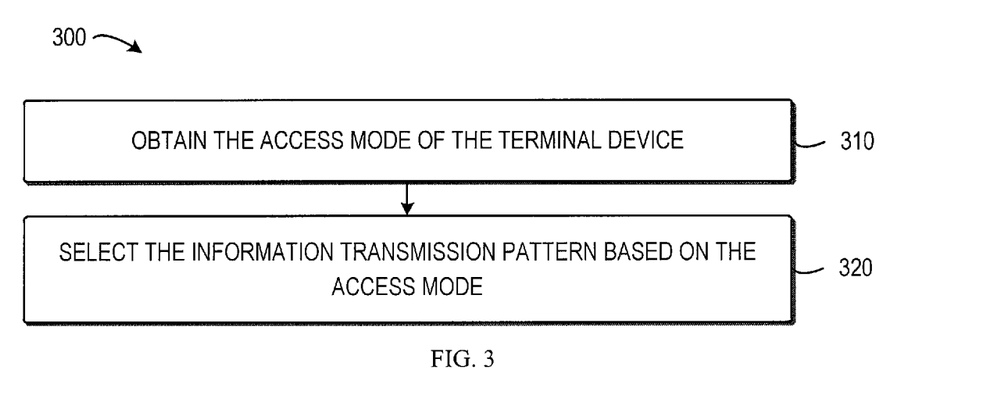
FIG. 3 shows a flowchart of a method 300 of configuring an information transmission pattern in accordance with an embodiment of the present disclosure.

In accordance with embodiments of the present disclosure, the information transmission pattern may be configured in a variety of ways. FIG. 3 shows a flowchart of a method 300 of configuring an information transmission pattern in accordance with an embodiment of the present disclosure. The method 300 may be performed at the network device 110 or other suitable device. The terminal device discussed in embodiments of FIG. 3 may be the terminal device 120 or 130, or other suitable terminal device.

At 310, the access mode of the terminal device is obtained. In some embodiments, the access mode may be determined by the network device 110, for example, based on system traffic, a coverage of the terminal device, and/or other relevant factors, e.g. required quality of service for a traffic. The system traffic may be determined based on a work load of the network device. For example, if the network device is serving a large number of UEs, it may be determined that the system traffic is high. Otherwise, if the network device is serving a small number of UEs, it may be determined that the system traffic is low. It is to be understood that there are many other ways to determine the system traffic, which are omitted for purpose of brief.

The coverage of the terminal device may be determined in several ways. In an embodiment, the coverage may be determined based on a quality of a channel between the network device and the terminal device. The quality of the channel may be determined according to one or more of signal strength indication (RSSI), bit error rate (BER), carrier-to-interference plus noise ratio, Signal-to-Noise Ratio (SNR), Signal to Interference plus Noise Ratio (SINR), signal power reported by the terminal device, and so on. In other embodiments, the access mode may be determined based on required quality of service for a traffic. In some further embodiments, the quality of service may be determined based on a type of the traffic. In other embodiments, the quality of service may be determined based on use cases.

In some embodiments, if the coverage of the terminal device exceeds a coverage threshold (that is, the terminal device has a good coverage) and/or the system traffic exceeds a traffic threshold (that is, the system traffic is heavy), the network device 110 may determine the NOMA mode as the access mode of the terminal device. If the coverage of the terminal device is less than the coverage threshold and/or the system traffic is less than the traffic threshold, the network device 110 may determine the MOMA mode as the access mode of the terminal device.

In addition, if the required QoS is lower than a predetermined QoS threshold, the network device 110 may determine the NOMA mode as the access mode of the terminal device. In other embodiments, if the required QoS is higher than the predetermined QoS threshold, the network device 110 may determine the MOMA mode as the access mode of the terminal device. It is to be understood that the above examples for obtaining the access mode are discussed for illustration rather than suggesting any limitation. In some alternative embodiments, the network device may perform blind detection on signals received from the terminal device and determine the access mode of the terminal device.

At 320, the information transmission pattern is selected from the first resource set and the second resource set based on the access mode of the terminal device. In some embodiments, in response to the access mode being the MOMA mode, the network device may select the information transmission pattern from the first resource set. In response to the access mode being the NOMA mode, the network device may select the information transmission pattern from the second resource set.

According to embodiments of the present disclosure, the network device 110 may transmit information about the information transmission pattern to the terminal device. The information transmission pattern may be transmitted via any suitable message, for example a Radio Resource Control (RRC) signaling.

Figure 4A:
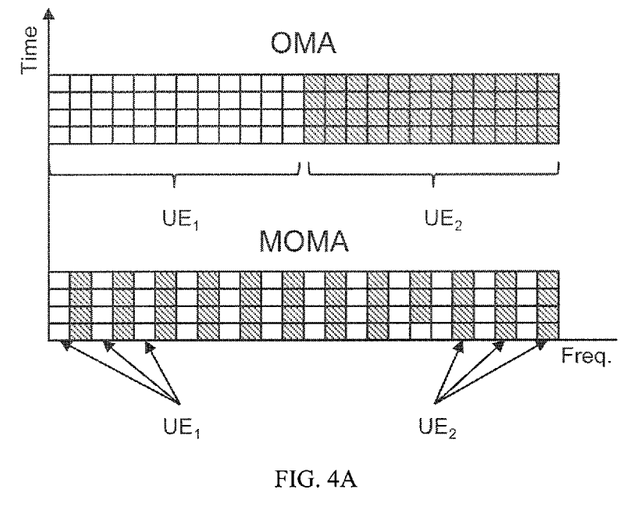
FIGS. 4A and 4B show diagrams of the MOMA mode in accordance with embodiments of the present disclosure, respectively.

Now more details of the MOMA mode are discussed with reference to embodiments of FIGS. 4A and 4B. In the MOMA mode, resource allocation may be redefined to enhance the system capacity. FIG. 4A shows a diagram of the MOMA mode in accordance with embodiments of the present disclosure. In the example of FIG. 4A, it is shown a time/frequency allocation system, with batches of 12 REs assigned onto each of the two UEs, whereas at the bottom we have the same amount of resources per UE (12 REs/UE), yet multiplexed in a different but still orthogonal fashion. In this illustration, the notion of the PRB as the smallest schedulable unit in frequency has vanished; such UE multiplexing can be considered as a 24-length vector, whose non-zero elements (the white blocks for $UE_1$ and the slashed blocks for $UE_2$) determine where each UE transmits. The spreading vectors for $UE_1$ (for example, the terminal device 120) and $UE_2$ (for example, the terminal device 130) are $s_1=[1_{12}{}^T \ 0_{12}{}^T]^T$, $s_2=[0_{12}{}^T \ 1_{12}{}^T]^T$ for the upper part of FIG. 4A, where $0_N$ ($1_N$) are the all-zeros (all-ones) vectors of length N. This corresponds to PRB-based allocation currently used in Orthogonal Multiple Access (OMA). The bottom part of FIG. 4A illustrates the MOMA mode, where the corresponding vectors are $s_1=[1 \ 0 \ \ldots \ 1 \ 0]^T$, $s_2=[0 \ 1 \ \ldots \ 0 \ 1]^T$, respectively, each of length N=24.

Figure 4B:
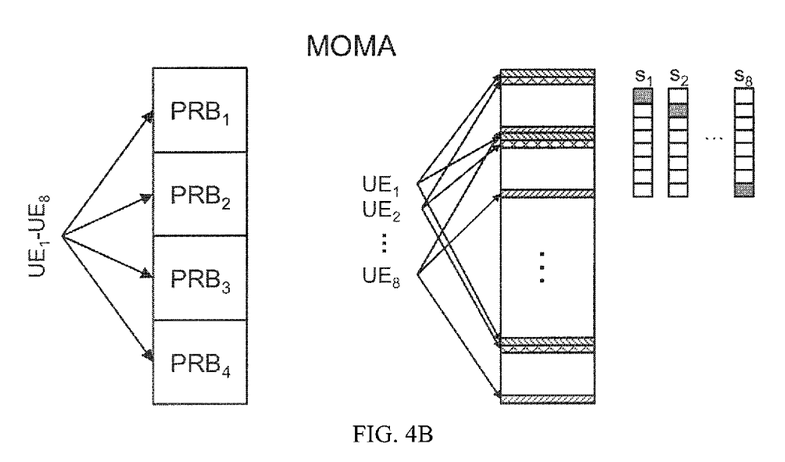

FIG. 4B shows a diagram of the MOMA mode applied in high UE density in accordance with embodiments of the present disclosure. In this example, it is assumed that there are K=8 UEs and 4 available PRBs for data transmission. In the MOMA mode, the 4 PRBs may be viewed as a 48-length vector and each UE occupies every k-th RE via a periodic occupancy pattern, i.e., $UE_1$ occupies REs with indices $\{1,9,17,25,33,41\}$. In some implementations/embodiments, the occupancy pattern can be different, e.g., $UE_1$ occupies the REs with indices $\{1,13\text{-}15,21,46\}$, $UE_2$ occupies REs with indices $\{3,22\text{-}24,31,40\text{-}42\}$ and so on. The function for each UE's occupancy pattern can be derived via a seed that is sent by the gNB.

In an example, if each MOMA UE is assigned ½PRB, thus the MCS/rate needs to be doubled to ensure transmission within the same time bounds as in OMA, where a UE would be assigned a whole PRB, but only if that is necessary. On the flip side, each UE can double the power per symbol if we assume the same total power budget per OFDM symbol as in OMA. For this reason, MOMA, performs very well in the low SNR regime where the transmission is power-limited. At the same time the sparsity of MOMA spreading makes it a good candidate for low PAPR. Single user detector is sufficient for decoding the received symbols since there is no inter-UE interference or pilot contamination.

Figure 5:
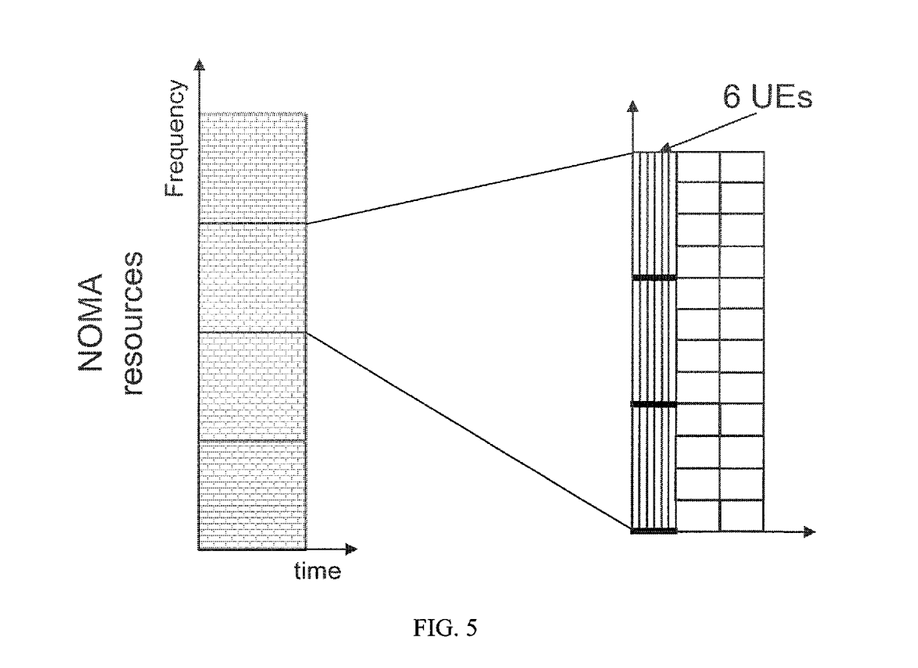
FIG. 5 shows a diagram of the NOMA mode in accordance with embodiments of the present disclosure.

Now details of the NOMA mode are discussed with reference to embodiments of FIG. 5, which shows a diagram of the NOMA mode in accordance with embodiments of the present disclosure. In the NOMA mode, the UEs overlap on the available resources and spread their information symbols using properly designed sequences. Assume that we have K=6 UEs and 4 available PRBs, for data transmission. Using the NOMA framework, the UEs are transmitting on all four PRBs but they are now overlapping within each PRB, where we can see that each symbol is spread using a 4-length vector (indicated by the rectangles). It is easy to see that, with 4 PRBs and 4-length spreading vectors, each UE transmits 12 symbols and hence has the same user rate with OMA, yet here we are able to fit more than L UEs, where L is the number of PRBs. Moreover, a MUD can be used in order to resolve the signals and decode each UE. For NOMA, reliable channel estimation is critical for attaining good performance, due to UE interference and pilot contamination. NOMA is superior to MOMA/OMA and performs very well in the medium-to-high SNR regime where the channel quality is good to separate well the UEs and exploit diversity to reliably decode their symbols.

According to embodiments of the present disclosure, the first resource set and/or the second resource set may be predefined or configured. For example, the first resource set may be configured with orthogonal multiplexing patterns, orthogonal spreading matrices, orthogonal RS patterns, and/or the like. The second resource set may be configured with non-orthogonal multiplexing patterns, non-orthogonal spreading matrices, non-orthogonal RS patterns, and/or the like. Now some examples of configuration of the spreading matrix are discussed below.

Generally, MOMA is beneficial in the lower SNR regime, and NOMA is superior to MOMA/OMA, and performs very well, in the high SNR regime. To implement MOMA, one method is to use the orthogonal frequency and/or time resources for different users; another way to implement MOMA is to use an orthogonal spreading matrix. Assume that 4 REs are shared by 4 UEs and the spreading matrix for each UE is given in Table 1.

TABLE 1

| Spreading matrix for MOMA | | | |
|---|---|---|---|
| 0.5 | 0.5 | 0.5 | 0.5 |
| 0.5 | −0.5 | 0.5 | −0.5 |
| 0.5 | 0.5 | −0.5 | −0.5 |
| 0.5 | −0.5 | −0.5 | 0.5 |

In NOMA case, though, overloading, which is defined as the ratio between the number of UEs and the length of the spreading vectors, can yield significant gains. In order to achieve these gains when system is overloading, the spreading matrix is not necessarily orthogonal; one such example is shown in Table 2, where the overloading is 150% (6 UEs using length-4 spreading vectors).

In one embodiment, two or more sets of spreading matrices are defined, each set of spreading matrix is used for one or more different overloading factors and user channel conditions (such as SNR). For example, orthogonal spreading matrix is used for lower SNR regime, non-orthogonal spreading matrix is used for higher SNR regime. As another example, for lower overloading factors, orthogonal spreading matrix is used and for higher overloading factors, non-orthogonal spreading matrix is used.

Now some embodiments of resource allocation are discussed with reference to FIGS. 6 and 7. Generally, MOMA is beneficial in the lower SNR regime. NOMA is superior to MOMA/OMA, and performs very well, in the high SNR regime.

As mentioned above, for the mMTC use-case, one aspect that we have to take into account is the large coverage. Capitalizing on the second observation it can be inferred that for UEs with good coverage, NOMA can be used. The remaining question is how to serve the poor coverage UEs, which is typically the case for cell-edge UEs. To address this question, two multiplexing methods are defined for the UEs: i) one multiplexing method is MOMA; and ii) another multiplexing method is NOMA. In the embodiments discussed with reference to FIG. 6, two resource sets (also referred to as "resource pools" hereafter) are configured for different UEs, as shown in FIG. 6. The multiplexing method for the first resource set (also referred to as pool #1) is based on MOMA and the other multiplexing method for the second resource set (also referred to as pool #2) is based on NOMA. The cell-edge UEs, can be further divided into two categories:

Category 1 (C1): The transmission power is at the maximum.

Category 2 (C2): The transmission power is not the maximum and there is enough power-boost space to achieve the target SNR.

For the cell-center UE, with good coverage, pool #2 is used. For C1 cell-edge UEs, it seems that pool #1 shall be used and there is no other good choice. For C2 cell-edge UEs, it is possible to use both pool ™1 and pool #2 depending on their channel conditions, i.e., if they have good coverage or not.

Figure 6:
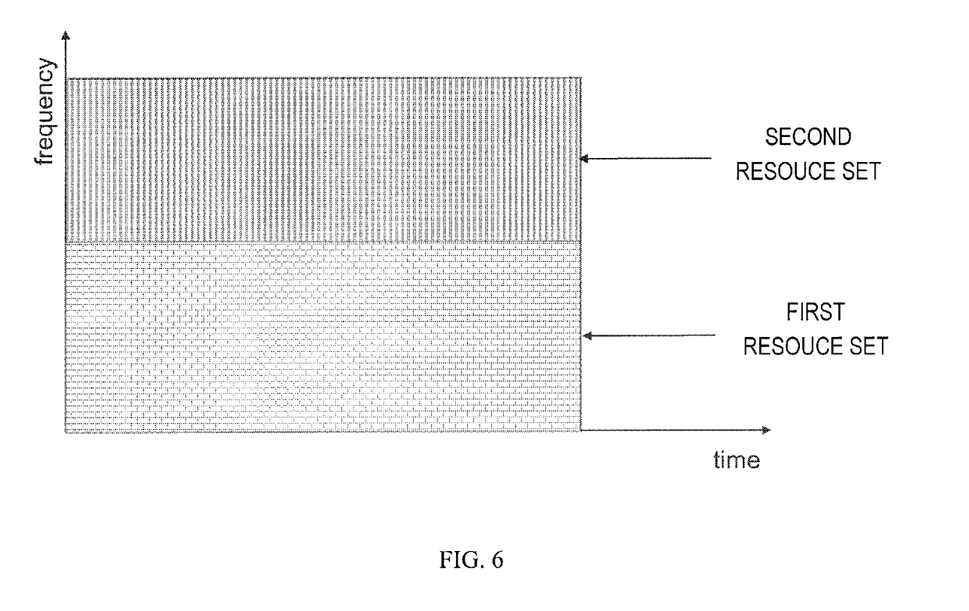
FIG. 6 shows a diagram of resource sets in accordance with embodiments of the present disclosure.
Figure 7:
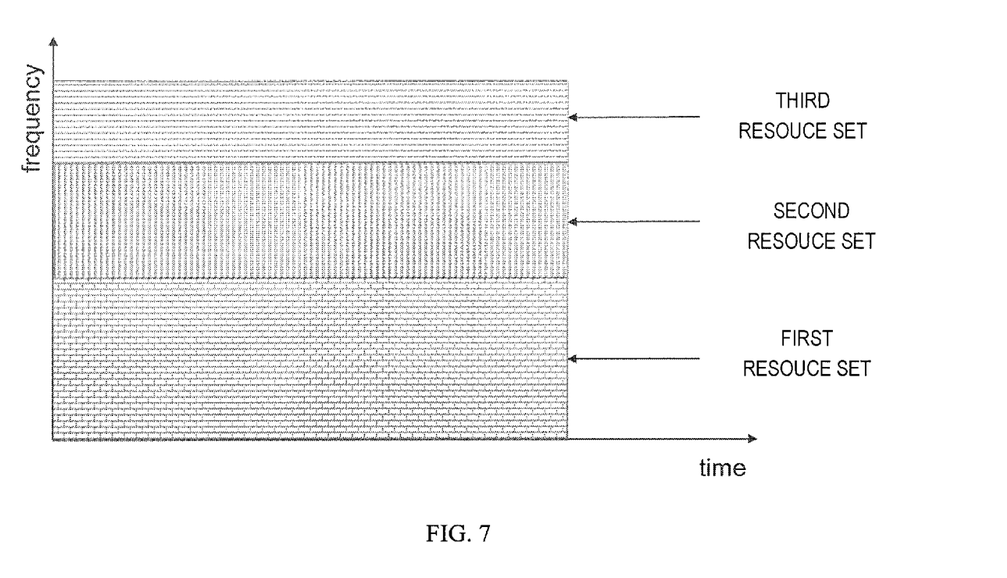
FIG. 7 shows a diagram of resource sets in accordance with further embodiments of the present disclosure.

The setup of the first and second resource sets is not limited to FIG. 6. The first resource set and the second resource set may have overlapping time/frequency resources but with different spreading matrices.

In some cases, a three-pool setup can be envisioned, where apart from pools #1 and #2, described above there is a third resource set for coexistence of NOMA and MOMA. The third resource set is associated with both the MOMA and NOMA modes. In an embodiment, the third resource set may be configured based on at least a part of the first resource set and at least a part of the second resource set. For example, the third resource set may be obtained by combining the first and second resource sets. It is to be understood that this is just an example, rather than limitation. In

TABLE 2

| spreading matrix for NOMA | | | | | |
|---|---|---|---|---|---|
| 0.5 + 0.0 i | 0.5 + 0.0 i | 0.5 + 0.0 i | 0.5 + 0.0 i | 0.5 + 0.0 i | 0.5 + 0.0 i |
| 0.0 + 0.5 i | 0.5 + 0.0 i | 0.0 + 0.5 i | 0.0 + 0.5 i | 0.0 + −0.5 i | 0.0 + −0.5 i |
| −0.5 + 0.0 i | 0.0 + 0.5 i | 0.0 + −0.5 i | 0.0 + 0.5 i | −0.5 + 0.0 i | 0.0 + 0.5 i |
| 0.0 + 0.5 i | 0.0 + −0.5 i | 0.5 + 0.0 i | −0.5 + 0.0 i | 0.0 + −0.5 i | 0.5 + 0.0 i | some alternative embodiments, the third resource set may be configured in any other suitable way as long as it is associated with the MOMA and NOMA modes. This setup can be beneficial when there is strong channel asymmetry between cell-center and C1 cell-edge UEs, e.g., more than 10 dB difference in the average received power. In this case, cell-center and C1 UEs may be paired in the third resource set (also referred to as pool #3), as shown in FIG. 7. The cell-center UEs use NOMA and C1 UEs use MOMA. In pool #3, the strong UEs may be first detected and interference cancellation may be used to remove their contribution. Then single-user detection can be used to decode C1-type UEs that are using MOMA.

Now some embodiments of the reference signal (RS) pattern are discussed with reference to FIGS. 8 and 9, which show diagrams of reference signal patterns in the MOMA mode and the NOMA mode in accordance with embodiments of the present disclosure, respectively.

In embodiments of the present disclosure, different RS patterns may be different for different pools. For the MOMA case, the RS, including DMRS (Demodulation Reference Signal) and PTRS (Phase Tracking Reference Signal), may be orthogonal in frequency and/or time domain. One example is shown in FIG. 8. For NOMA case, the REs carrying the RS may be shared by multiple UEs. One example for the sharing is via cyclic shift and/or comb. One example is shown in FIG. 9.

According to embodiments of the present disclosure, optionally, the pool sizes may be dynamically configured by the gNB. In some embodiments, the pools may be released with dynamic grants. In some embodiments, the pools may be repeated via SPS.

In some embodiments, the assignment of UEs onto the pools may be conducted via machine intelligence.

In some embodiments, the NOMA spreading vectors may be designed to achieve, with equality, the Welch bound, which is a bound on the sum of the 2m-th powers of cross-correlation of a set of vectors.

In some embodiments, the pairing of NOMA-based and MOMA-based UEs on pool #3 may be conducted via machine intelligence.

Figure 10:
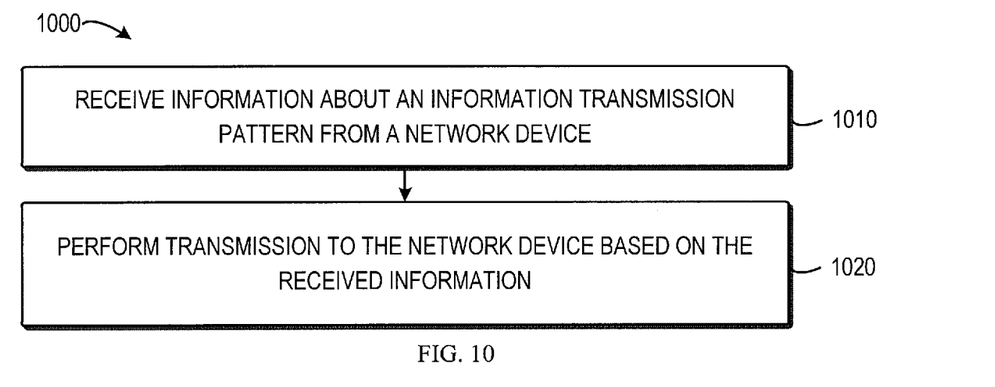
FIG. 10 shows a flowchart of a method 1000 of UL signal transmission in accordance with an embodiment of the present disclosure.

FIG. 10 shows a flowchart of a method 1000 of UL signal transmission in accordance with an embodiment of the present disclosure. It would be appreciated by those skilled in the art that the method 1000 may be implemented by a terminal device, such as the terminal device 120 or 130, or other suitable devices. The network device discussed in the embodiments may be the network device 110.

The method 1000 is entered at block 1010, where the terminal device receives information about an information transmission pattern from a network device. The information transmission pattern is configured by the network device based on an access mode of the terminal device from a first resource set associated with the MOMA mode and a second resource set associated with the NOMA mode. At block 1020, the terminal device performs transmission to the network device based on the received information.

In some embodiments, the information about an information transmission pattern may include the actual information transmission pattern. In this case, the terminal device may directly extract the information transmission pattern from the information and perform the UL transmission base thereon.

Alternatively, in some embodiments, the information about an information transmission pattern may include an indication of the information transmission pattern. Upon receipt of such information, the terminal device may determine the information transmission pattern from the first resource set and the second resource set based on the received information. Then, the terminal device may perform the transmission to the network device based on the determined information transmission pattern.

In some embodiments, the network device may predefine or configure the first resource set and the second resource set in advance, and may transmit related information to the terminal device. In such a case, the terminal device may receive, from the network device, information about the first resource set and the second resource set.

In some embodiments, the information transmission pattern includes a multiplexing pattern, a spreading matrix, a reference signal pattern, and/or other suitable information.

Figure 11:
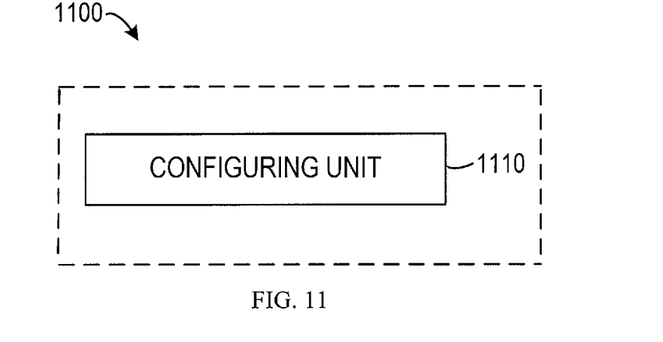
FIG. 11 shows a block diagram of an apparatus 1100 implemented at a network device in accordance with an embodiment of the present disclosure.

FIG. 11 shows a block diagram of an apparatus 1100 implemented at a network device in accordance with an embodiment of the present disclosure. It would be appreciated that the apparatus 1100 may be implemented at a network device, for example, the network device 110 or any other suitable device.

As shown, the apparatus 1100 includes a configuring unit 1110. The configuring unit 1110 is configured to configure, based on an access mode of a terminal device, an information transmission pattern for the terminal device from a first resource set associated with a MOMA mode and a second resource set associated with a NOMA mode.

In an embodiment, the configuring unit 1110 may be configured to obtain the access mode of the terminal device; and select the information transmission pattern from the first resource set and the second resource set based on the access mode of the terminal device.

In an embodiment, the configuring unit 1110 may be configured to determine the access mode of the terminal device based on at least one of a coverage of the terminal device, system traffic and required QoS for a traffic.

In an embodiment, the configuring unit 1110 may be configured to, in response to the coverage of the terminal device exceeding a coverage threshold and/or the system traffic exceeding a traffic threshold and/or the required QoS being lower than a predetermined QoS threshold, determine the NOMA mode as the access mode of the terminal device; and in response to the coverage of the terminal device being less than the coverage threshold and/or the system traffic and/or the required QoS being higher than the predetermined QoS threshold being less than the traffic threshold, determine the MOMA mode as the access mode of the terminal device.

In an embodiment, the configuring unit 1110 may be further configured to determine the coverage of the terminal device based on a quality of a channel between the network device and the terminal device; determine the system traffic based on a work load of the network device; and determining the quality of service based on a type of the traffic or use case.

In an embodiment, the configuring unit 1110 may be configured to in response to the access mode being the MOMA mode, select the information transmission pattern from the first resource set; and in response to the access mode being the NOMA mode, select the information transmission pattern from the second resource set.

In an embodiment, the configuring unit 1110 may be configured to configure the first resource set and the second resource set.

In an embodiment, the information transmission pattern may include one or more of: a multiplexing pattern, a spreading matrix, and a reference signal pattern.

In an embodiment, the apparatus 1100 may further comprise a transmitting unit configured to transmit information about the information transmission pattern to the terminal device.

Figure 12:
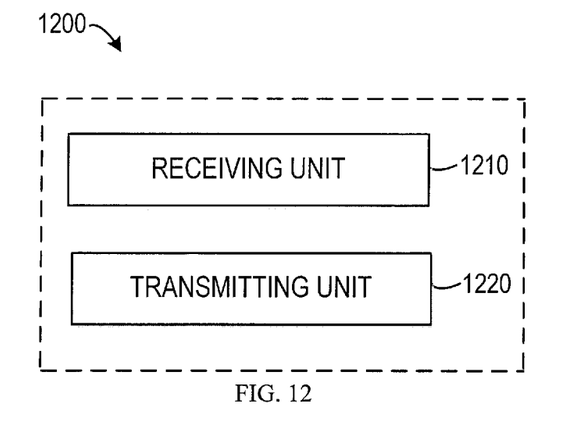
FIG. 12 shows a block diagram of an apparatus 1200 implemented at a terminal device in accordance with an embodiment of the present disclosure.

FIG. 12 shows a block diagram of an apparatus 1200 implemented at a terminal device in accordance with an embodiment of the present disclosure. It would be appreciated that the apparatus 1200 may be implemented at a terminal device, for example, the terminal device 120 or 130, or any other suitable device.

As shown, the apparatus 1200 includes a receiving unit 1210 and a transmitting unit 1220. The receiving unit 1210 is configured to receive information about an information transmission pattern from a network device. The information transmission pattern is configured by the network device based on an access mode of the terminal device from a first resource set associated with a MOMA mode and a second resource set associated with a NOMA mode. The transmitting unit 1220 is configured to perform transmission to the network device based on the received information.

In an embodiment, the transmitting unit 1220 is further configured to determine, based on the received information, the information transmission pattern from the first resource set and the second resource set; and perform the transmission to the network device based on the information transmission pattern.

In an embodiment, the receiving unit 1220 is further configured to receive, from the network device, information about the first resource set and the second resource set configured at the network device.

In an embodiment, the information transmission pattern includes one or more of: a multiplexing pattern, a spreading matrix, and a reference signal pattern.

It should be appreciated that components included in the apparatuses 1100 and 1200 correspond to the operations of the methods 200 and 1000, respectively. Therefore, all operations and features described above with reference to FIGS. 2 and 10 are likewise applicable to the components included in the apparatuses 1100 and 1200 and have similar effects, respectively. For the purpose of simplification, the details will be omitted.

The components included in the apparatus 1100 or 1200 may be implemented in various mariners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the apparatus 1100 or 1200 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 13:
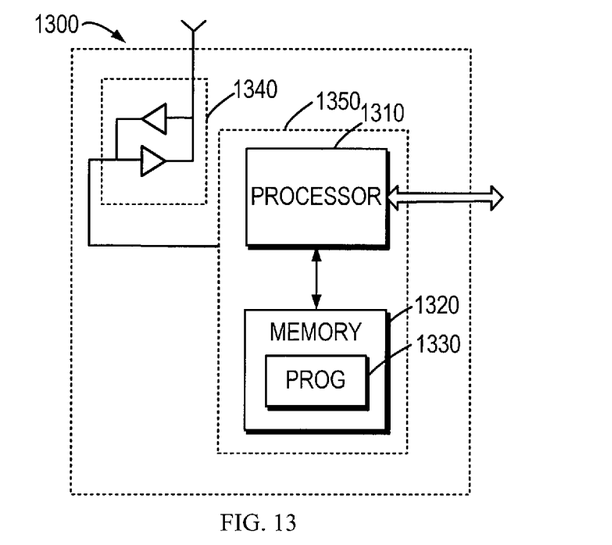
FIG. 13 shows a simplified block diagram 1300 of a device that is suitable for use in implementing embodiments of the present disclosure.

FIG. 13 is a simplified block diagram of a device 1300 that is suitable for implementing embodiments of the present disclosure. As shown, the device 1300 includes one or more processors 1310, one or more memories 1320 coupled to the processor(s) 1310, one or more transmitters and/or receivers (TX/RX) 1340 coupled to the processor 1310.

The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 1320 stores at least a part of a program 1330. The TX/RX 1340 is for bidirectional communications. The TX/RX 1340 has at least one antenna to facilitate communication, though in practice an Access Node mentioned in this application may have several ones. The communication interface may represent any interface that is necessary for communication with other network elements.

The program 1330 is assumed to include program instructions that, when executed by the associated processor 1310, enable the device 1300 to operate in accordance with the embodiments of the present disclosure, as discussed herein with reference to FIGS. 2, 3 and 10. That is, embodiments of the present disclosure can be implemented by computer software executable by the processor 1310 of the device 1300, or by hardware, or by a combination of software and hardware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method in a network device, comprising:
    obtaining an access mode of a terminal device, obtaining the access mode of the terminal device comprising determining the access mode of the terminal device based on at least one of a coverage of the terminal device, system traffic, and required quality of service, QoS, for a traffic, determining the access mode comprising detecting a channel asymmetry between a cell-center terminal device and cell-edge terminal device and, based on the detected channel asymmetry, using interference cancellation to remove an uplink contribution of the cell-center terminal device; and
    selecting, based on the access mode of the terminal device, an information transmission pattern for the terminal device from one of a first resource set associated with a multiplexed orthogonal multiple access, MOMA, mode, a second resource set associated with a non-orthogonal multiple access, NOMA, mode and a third resource set associated with both the MOMA and NOMA mode, the third resource set being configured such that a cell-center terminal device uses the NOMA mode and a cell-edge terminal device uses the MOMA mode.

2. The method according to claim 1, wherein determining the access mode of the terminal device comprising:
    in response to the coverage of the terminal device exceeding a coverage threshold and/or the system traffic exceeding a traffic threshold and/or the required QoS being lower than a predetermined QoS threshold, determining the NOMA mode as the access mode of the terminal device; and
    in response to the coverage of the terminal device being less than the coverage threshold and/or the system traffic being less than the traffic threshold and/or the required QoS being higher than the predetermined QoS threshold, determining the MOMA mode as the access mode of the terminal device.

3. The method according to claim 1, further comprising at least one of:
    determining the coverage of the terminal device based on a quality of a channel between the network device and the terminal device;
    determining the system traffic based on a work load of the network device, and
    determining the quality of service based on a type of the traffic or use case.

4. The method according to claim 1, wherein selecting the information transmission pattern comprises:
    in response to the access mode being the MOMA mode, selecting the information transmission pattern from the first resource set; and
    in response to the access mode being the NOMA mode, selecting the information transmission pattern from the second resource set.

5. The method according to claim 1, further comprising:
    configuring the first resource set and the second resource set.

6. The method according to claim 1, wherein the information transmission pattern includes one or more of: a multiplexing pattern, a spreading matrix, and a reference signal pattern.

7. The method according to claim 1, further comprising:
    transmitting information about the information transmission pattern to the terminal device.

8. The method of claim 1, wherein selecting an information transmission pattern for a terminal device further comprises selecting an information transmission pattern from the third resource set associated with NOMA mode and selecting an information transmission pattern for a terminal proximate a cell edge comprises selecting an information transmission pattern from the third resource set associated with MOMA mode.

9. The method of claim 1, further comprising detecting a strong channel asymmetry between a cell-center and a terminal device and using interference cancellation to remove a contribution of the terminal device with the strong channel asymmetry.

10. A method in a terminal device, comprising:

receiving information about an information transmission pattern from a network device, the information transmission pattern being configured by the network device based on an access mode of the terminal device, the network device determining the access mode of the terminal device based on at least one of a coverage of the terminal device, system traffic, and required quality of service, QoS, for a traffic, determining the access mode comprising the network device detecting a channel asymmetry between a cell-center terminal device and cell-edge terminal device and, based on the detected channel asymmetry, using interference cancellation to remove an uplink contribution of the cell-center terminal device, the information transmission pattern being configured from one of a first resource set associated with a multiplexed orthogonal multiple access, MOMA, mode, a second resource set associated with a non-orthogonal multiple access, NOMA, mode and a third resource set associated with both the MOMA and NOMA mode, the third resource set being configured such that a cell-center terminal device uses the NOMA mode and a cell-edge terminal device uses the MOMA mode;

performing transmission to the network device based on the received information; and the information transmission pattern including one or more of a spreading matrix and a reference signal pattern.

11. The method according to claim 10, wherein performing transmission to the network device comprises:

determining, based on the received information, the information transmission pattern from the first resource set and the second resource set; and performing the transmission to the network device based on the information transmission pattern.

12. The method according to claim 11, further comprising:

receiving, from the network device, information about the first resource set and the second resource set configured at the network device.

13. A network device, comprising:

a processor; and a memory, the memory containing program including instructions executable by the processor, the processor being configured to cause the network device to:

obtain an access mode of a terminal device, the processor configured to obtain the access mode of the terminal device by determining the access mode of the terminal device based on at least one of a coverage of the terminal device, system traffic, and required quality of service, QoS, for a traffic, determining the access mode comprising detecting a channel asymmetry between a cell-center terminal device and cell-edge terminal device and, based on the detected channel asymmetry, using interference cancellation to remove an uplink contribution of the cell-center terminal device; and select, based on the access mode of the terminal device, an information transmission pattern for the terminal device from one of a first resource set associated with a multiplexed orthogonal multiple access, MOMA, mode, a second resource set associated with a non-orthogonal multiple access, NOMA, mode and a third resource set associated with both the MOMA and NOMA modes, the third resource set being configured such that a cell-center terminal device uses the NOMA mode and a cell-edge terminal device uses the MOMA mode.

14. The network device according to claim 13, wherein the processor is further configured to cause the network device to:

in response to the coverage of the terminal device exceeding a coverage threshold and/or the system traffic exceeding a traffic threshold and/ or the required QoS being lower than a predetermined QoS threshold, determine the NOMA mode as the access mode of the terminal device; and in response to the coverage of the terminal device being less than the coverage threshold and/or the system traffic being less than the traffic threshold and/ or the required QoS being higher than the predetermined QoS threshold, determine the MOMA mode as the access mode of the terminal device.

15. The network device according to claim 13, wherein the processor is further configured to cause the network device to perform at least one of:

determining the coverage of the terminal device based on a quality of a channel between the network device and the terminal device; and determining the system traffic based on a work load of the network device.

16. The network device according to claim 13, wherein the processor is further configured to cause the network device to:

in response to the access mode being the MOMA mode, select the information transmission pattern from the first resource set;

in response to the access mode being the NOMA mode, select the information transmission pattern from the second resource set; and determine the quality of service based on a type of the traffic or use case.

17. The network device according to claim 13, wherein the processor is further configured to cause the network device to:

configure the first resource set and the second resource set.

18. The network device according to claim 13, wherein the information transmission pattern includes one or more of: a multiplexing pattern, a spreading matrix, and a reference signal pattern.

19. The network device according to claim 13, wherein the processor is further configured to cause the network device to:

transmit information about the information transmission pattern to the terminal device.

20. A terminal device, comprising:

a processor; and a memory, the memory containing program including instructions executable by the processor, the processor being configured to cause the terminal device to:

receive information about an information transmission pattern from a network device, the information transmission pattern being configured by the network device based on an access mode of the terminal device, the network node determining the access mode of the terminal device based on at least one of a coverage of the terminal device, system traffic, and required quality of service, QoS, for a traffic, determining the access mode comprising the network device detecting a channel asymmetry between a cell-center terminal device and cell-edge terminal device and, based on the detected channel asymmetry, using interference cancellation to remove an uplink contribution of the cell-center terminal device, the information transmission pattern being configured from one of a first resource set associated with a multiplexed orthogonal multiple access, MOMA, mode, a second resource set associated with a non-orthogonal multiple access, NOMA, mode and a third resource set associated with both the MOMA and NOMA modes, the third resource set being configured such that a cell-center terminal device uses the NOMA mode and a cell-edge terminal device uses the MOMA mode;

perform transmission to the network device based on the received information; and the information transmission pattern including one or more of a spreading matrix and a reference signal pattern.

21. The terminal device according to claim 20, wherein the processor is further configured to cause the terminal device to:

determine, based on the received information, the information transmission pattern from the first resource set and the second resource set; and perform the transmission to the network device based on the information transmission pattern.

22. The terminal device according to claim 21, wherein the processor is further configured to cause the terminal device to:

receive, from the network device, information about the first resource set and the second resource set configured at the network device.

* * * * *